(12) United States Patent
Van Cor

(10) Patent No.: US 11,788,570 B1
(45) Date of Patent: Oct. 17, 2023

(54) Z LAYER ENGINEERED THREADED CONNECTORS AND SYSTEMS

(71) Applicant: Van Cor Threads, LLC, Winchester, NH (US)

(72) Inventor: Dale E. Van Cor, Winchester, NH (US)

(*) Notice: Subject to any disclaimer, the term of this patent is extended or adjusted under 35 U.S.C. 154(b) by 668 days.

(21) Appl. No.: 15/833,432

(22) Filed: Dec. 6, 2017

Related U.S. Application Data

(60) Provisional application No. 62/430,716, filed on Dec. 6, 2016.

(51) Int. Cl.
*F16B 35/04* (2006.01)
*F16B 33/02* (2006.01)

(52) U.S. Cl.
CPC .................. *F16B 33/02* (2013.01)

(58) Field of Classification Search
CPC ............................................. F16B 33/02
USPC ........................................... 411/411
See application file for complete search history.

(56) References Cited

U.S. PATENT DOCUMENTS

| | | | | |
|---|---|---|---|---|
| 2,423,762 A * | 7/1947 | Everett | ................ | A61M 5/347 604/241 |
| 2,581,690 A * | 1/1952 | Moehle et al. | .......... | F16B 33/02 411/308 |
| 2,679,774 A * | 6/1954 | MacDonald | ........... | B21H 3/025 470/11 |
| 3,266,363 A * | 8/1966 | Bronson et al. | ........ | F16B 33/02 411/436 |
| 4,171,012 A * | 10/1979 | Holmes | .................. | F16B 33/02 411/285 |
| 4,432,682 A * | 2/1984 | McKewan | .............. | F16B 33/02 411/311 |
| 4,437,804 A * | 3/1984 | Fischer | .................. | F16B 33/02 411/59 |
| 4,850,775 A * | 7/1989 | Lee et al. | ............... | F16B 33/02 411/366.3 |
| 6,158,785 A * | 12/2000 | Beaulier et al. | ..... | E21B 17/042 285/334 |
| 6,371,709 B1* | 4/2002 | Papafotiou et al. | ...... | B21H 3/02 238/372 |
| 8,511,960 B1* | 8/2013 | Folk | ....................... | F16B 33/02 411/424 |
| 9,670,741 B2* | 6/2017 | DeHart | ................ | F16L 15/004 |
| 2002/0044850 A1* | 4/2002 | Watanabe | ............. | F16B 39/284 411/311 |
| 2004/0184897 A1* | 9/2004 | Levey et al. | ............ | F16B 33/02 411/411 |
| 2011/0008130 A1* | 1/2011 | Cor | ........................ | F16B 33/02 411/425 |

* cited by examiner

*Primary Examiner* — Gary W Estremsky
(74) *Attorney, Agent, or Firm* — Michael Persson; Chisholm, Persson & Ball, PC

(57) ABSTRACT

A threaded connector system including a male threaded connector and a female part, where at least one of the outer surface of the male threaded connector and the inner surface of the female part includes at least one Z layer structure, including a Z seat, Z ridge, Z rib, Z tooth, Z snap lock, Z stack and Z channel.

7 Claims, 16 Drawing Sheets

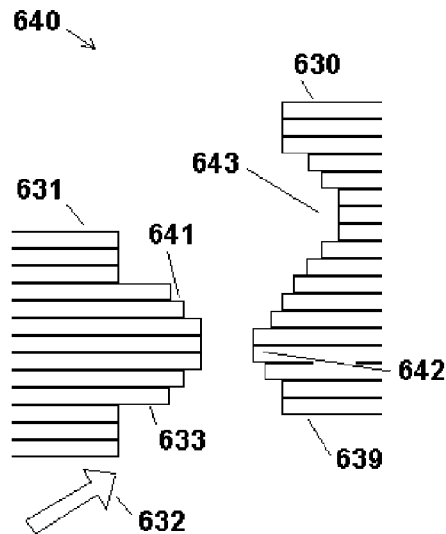
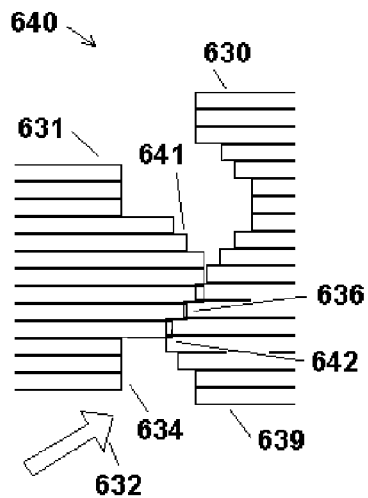
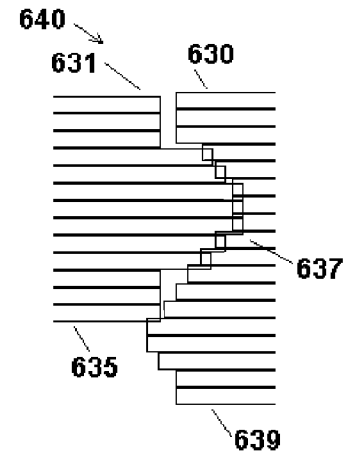
Fig. 13A　　　　　Fig. 13B　　　　　Fig. 13C
Fig. 14

Z LAYER ENGINEERED THREADED CONNECTORS AND SYSTEMS

CLAIM OF PRIORITY

This application claims the benefit of priority of U.S. Provisional Pat. Application Serial No. 62/430,716, filed on Dec. 6, 2016.

BACKGROUND OF THE INVENTION

A common problem encountered by users of threaded connections is creating a fluid seal that will not leak. Standard threads have 30-35% surface contact and, as a result, standard threads do not have enough surface contact to discourage a continuous leak path. Accordingly, most prior art threaded connectors used in fluid transport applications have heretofore used secondary sealing structures such as gaskets, o-rings, thread compounds and the like the create a fluid tight seal. The use of these secondary sealing structures adds to the cost of the threaded connection and reduces the reliability of the connection.

In response to this problem, the inventor of the present invention developed a new class of threaded connectors known as "Van Cor Threads." Van Cor Threads are a type of near total surface contact threaded connections that have enough surface contact and material elasticity to discourage a continuous leak path and create a reliable seal without the need for secondary sealing structures. One problem faced by the inventor of the present invention in connection with Van Cor Threads was the economical manufacture of these connections, as traditional machining processes used to form threads were not readily adapted to produce the complex geometries at required tolerances. As a result, the inventor determined that 3D fabrication was the most economical method for manufacturing Van Cor Threads.

3D fabrication is also known as additive manufacturing technology, and more commonly 3D printing. It builds parts by adding material typically in layers. 3D printing is used in design, engineering, prototyping and manufacturing.

Adding layers of material requires controlling the layer thickness and boundaries of a part. The layers are the part's Z axis and the boundaries are the XY coordinates. 3D printing tends to be accurate on its Z axis such as layers within 0.001" per inch. The XY boundaries are a lower accuracy. For a Z of 0.001", the XY would be in the range of 0.003"-0.004". For parts made with different machines, the Z will be more consistent, while the XY will vary more with different printing processes and software.

Over 200 of the 5000 plus models were 3D printed during the research a development of the above referenced Van Cor Threads. The first working model of a Van Cor Thread connector to hold 20 psi of air for an hour on a 1" pipe connection had an XYZ resolution of 0.002". That was more than a million points over a 1.3" thread length. The STL print file was over 16 million lines exceeding a gigabyte of data. Larger Van Cor Thread connectors will require substantially larger amounts of data. Higher resolution will require larger amounts of data.

3D printing standard threads to increase surface contact to levels capable of discouraging a continuous leak path and creating a reliable seal without the need for secondary sealing structures has a similar problem. In the above mentioned first working model had a ½" NPT pipe thread connected to an air supply. It had an XYZ resolution of 0.002" for 380,000 points; its 3D STL file was over 288 megabytes.

The CAD industry does not create the large thread data in drawings and this is reflected in 3D printing. What is needed is a short cut; a way to make threads with good surface contact, less data and at a lower resolution.

The concept of Z layer engineering is adding seals, connections, fasteners and channels to an existing component by modifying its coordinates per Z layer. The Z layer engineering modifications to the systems and structures of the present invention can be coded in the CAD process and created during the 3D print process. Being able to work at the printer's resolution will create the highest quality 3D printed parts possible. The 3D print build software translates the CAD drawing into Z layers. Z layer engineered structures are added during that process.

SUMMARY OF THE INVENTION

The solution to creating a 3D printed threads that can seal is to overcome the irregularities of 3D printing using the more predictable Z layers to create plugs. Improving a 3D printed connection would align mechanical stresses. Enhancing 3D fastening capabilities would be making quick connect mating parts more "sticky". Adding channels is transfer space for fluids or gas, other printing or adding structural properties.

A plug would be a predictable male surface against a mating female surface. The Z layer engineering invention is extending and retracting layers to create Z layer structures that will plug. Even smooth surfaces magnified will look rough. An extension of a few Z layers will make a Z ridge that deforms or cuts into a mating surface that will seat and seal the surfaces of male and female thread. Modifying Z layers to make a matching flat ring on a male and female thread will form that plug that is a Z seat. These multiple or singular Z seats and Z ridges can be relatively small so a small amount of pressure will provide the compressional force to seat or deform. The Z ridge is best applied against a finished conventional "store bought" part. The Z seat is best used with another 3D printed part.

A threaded component is an inherent clamp that pressurizes the terminal position. Z seat is a custom designed plug that can be applied to any curved 3D printed surface where the specific Z layers are modified to form a flat Z seat designed to align with a mating Z seat. That applies to any thread that changes its diameter such as API (American Petroleum Institute), NPT (National Pipe Thread) and VCT (Van Cor Threads). Clamping can be pressure or vacuum sources other than a thread such as a valve. Its contact surfaces can have Z seats.

While these Z ridges and Z seats are best applied in 3D printing, they could be molded, machined or made with other fabrication processes. Any mating curved or angular surface can be Z seated to align for a more predictable conduction of heat, transmit vibration, withstand tensile load and create a seal. They are not necessarily replacing the curved or angular surfaces that will bear the brunt of mechanical forces. They are adding precision to their surface connections. These flat Z layer areas will also direct stress axially as opposed to being vectored by curved or angular surfaces.

In the development and testing of the Z seat software, something simpler but more comprehensive was realized: the flat Z layer structures could be applied to the entire surface. This is a rendering process where multiple Z layers identified as a stack are assigned XY values of one layer. These stacks will take a curved or angular surface and gives it a step like appearance. Multiple stacking will follow the same surface shape. The purpose is for more reliable assembly with mating stacked parts. The XY rendering of curved and angular surfaces will vary with machines while stacking maximizes the use of the more predictable Z value within a specific XY tolerance.

Teeth are another tool that can be added at the Z layer for fastening. Snap locks are a precision fastening system for the mating of the male and female surface. They have to be compressed to a release threshold where they are held in place. A counter force will release them. Multitudes of these miniature snap locks can hold two surfaces together giving them a "sticky" quality.

The Z layer engineering structures have been described as modifications on the surfaces. Channels are internal, a space that can be used for gas/fluid/plasma. That same space can be filled from an additional print mechanism. A spooling device for an electric line, fiber optic tube or reinforcing fiber; or a printing device with electrical conductive material or transparent light conductive material.

Therefore, it is an aspect of the present invention to produce threaded connectors that include Z layer structures that form a seal without the use of separate sealing structures.

Is an aspect of the present invention to produce threaded connectors having Z structures printed on Z layers by adding or removing material on a Z layer with the effect of extending or subtracting boundaries or forming cavities.

It is an aspect of the present invention to produce threaded connector systems having Z seat surfaces and/or cavities to make mating flat areas for male/female engagement.

It is an aspect of the present invention to produce threaded connector systems having multiple Z seats to seal against fluids in plumbing, hydraulic or pneumatic applications.

It is an aspect of the present invention to produce threaded connectors having Z ridges sized and dimensioned to deform or cut into an opposed surface.

It is an aspect of the present invention to produce threaded connectors having Z rib extensions that deform or cut into the opposed surface in a geometry.

It is an aspect of the present invention to produce threaded connectors having Z ridges and Z ribs disposed on the same threaded connector.

It is an aspect of the present invention to produce threaded connectors having Z teeth extensions to deform or cut into the opposed surface in a geometry.

It is an aspect of the present invention to produce threaded connector systems having Z snap lock extensions and cavities that mate with engaged male and female threads.

It is an aspect of the present invention to produce threaded connector systems having Z stacking extensions and cavities that convert curves and angles into a step like geometry.

It is a still further aspect of the present invention to produce threaded connectors and connector systems that include sealing Z structures and Z channel interior cavities These aspects of the invention are not meant to be exclusive and other features, aspects, and advantages of the present invention will be readily apparent to those of ordinary skill in the art when read in conjunction with the above description and accompanying drawings.

BRIEF DRAWINGS DESCRIPTIONS

FIG. 1. is a front view of a partial wave threaded bolt with cross sectional view of a mating female wave threaded nut FIG. 2. is a magnified view of the portion of FIG. 1 shown in the rectangular box 103 showing ridges and seated engagement with cross section of female thread.

FIG. 3. is a magnified view of the portion of FIG. 2 shown in the rectangular box 170 showing a Z ridge under the bolt flank engaged with female thread.

FIG. 4. is a magnified view of the portion of FIG. 2 shown in the rectangular box 190 showing a Z ridge over the bolt flank engaged with female thread.

FIG. 5. is a magnified view of the portion of FIG. 2 shown in the rectangular box 110 showing a flank Z seated engagement of bolt with female thread.

FIG. 6. is a magnified view of the portion of FIG. 2 shown in the rectangular box 130 showing a root Z seated engagement of bolt with female thread.

FIG. 7. is a magnified view of the portion of FIG. 2 shown in the rectangular box 150 showing a crest Z seated engagement of bolt with female thread.

Figure 9:
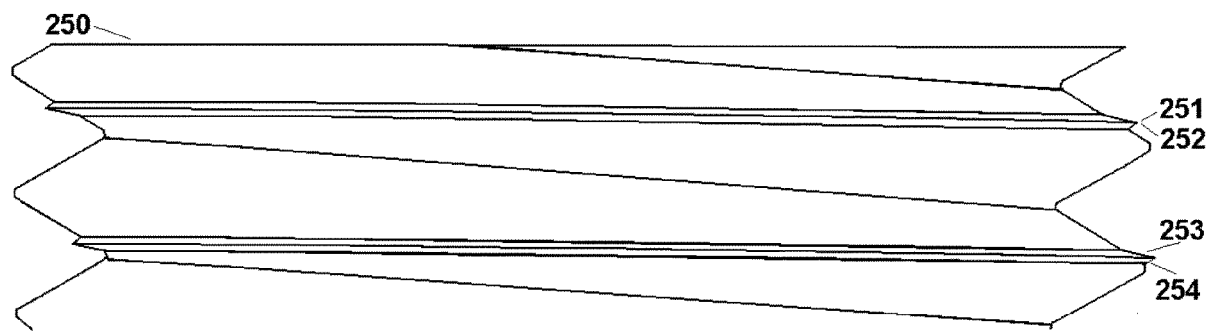

FIG. 9. is a partial side view of a ½" NPT pipe thread with Z ridges applied thereto.

Figure 10:
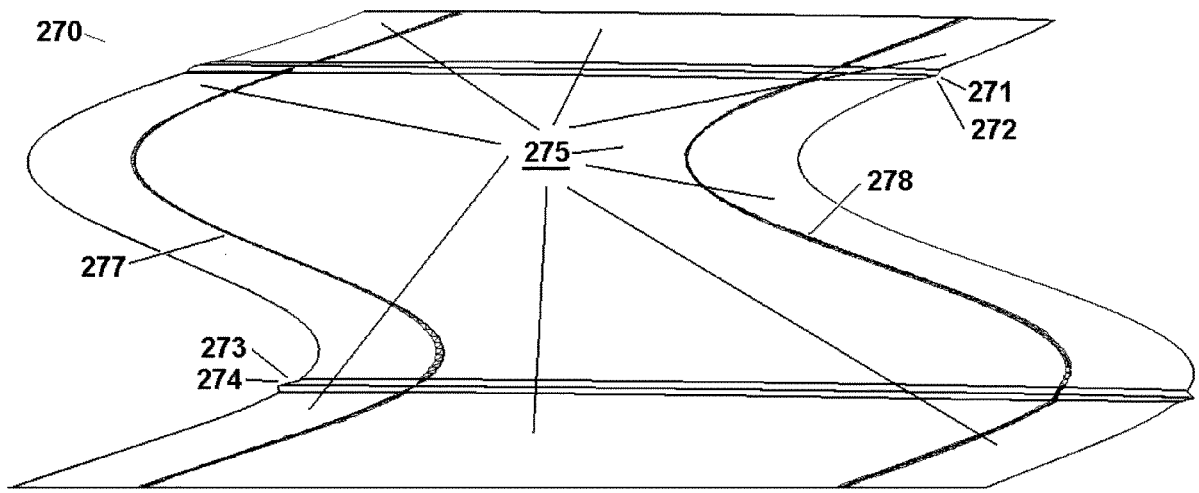
Figure 11:
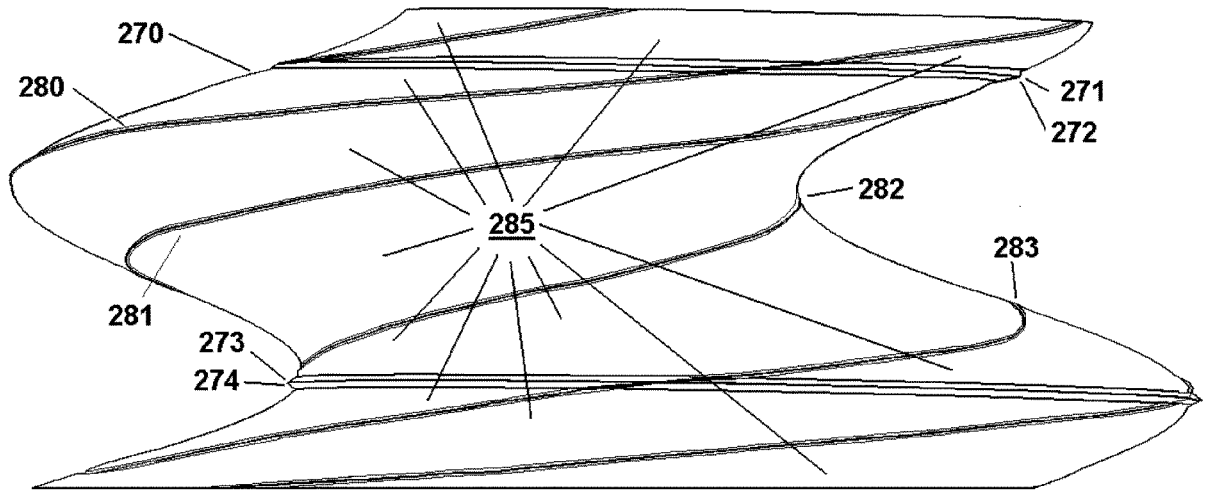

FIG. 10. is a side view of a wave threaded part with vertical Z ribs,

FIG. 11. is a side view of a wave threaded part with Z ribs following the same wave position.

Figure 12:
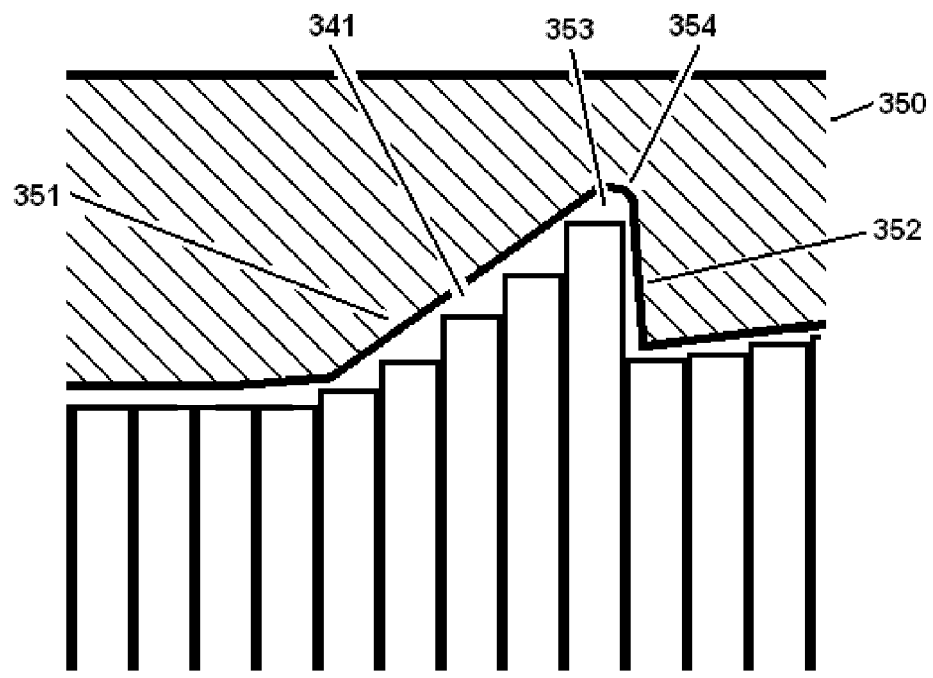

FIG. 12. is a cross section view of a fastening Z tooth.

FIG. 13A is a cross section view of a male and female Z snap lock parts in an unengaged position.

FIG. 13B is a cross section view of the male and female Z snap lock parts of FIG. 13A at a point of collision.

FIG. 13C is a cross section view of the male and female Z snap lock parts of FIG. 13A at an engaged position.

FIG. 14. is a cross section view of a male and female pats with curves and angle sides.

Figure 15:
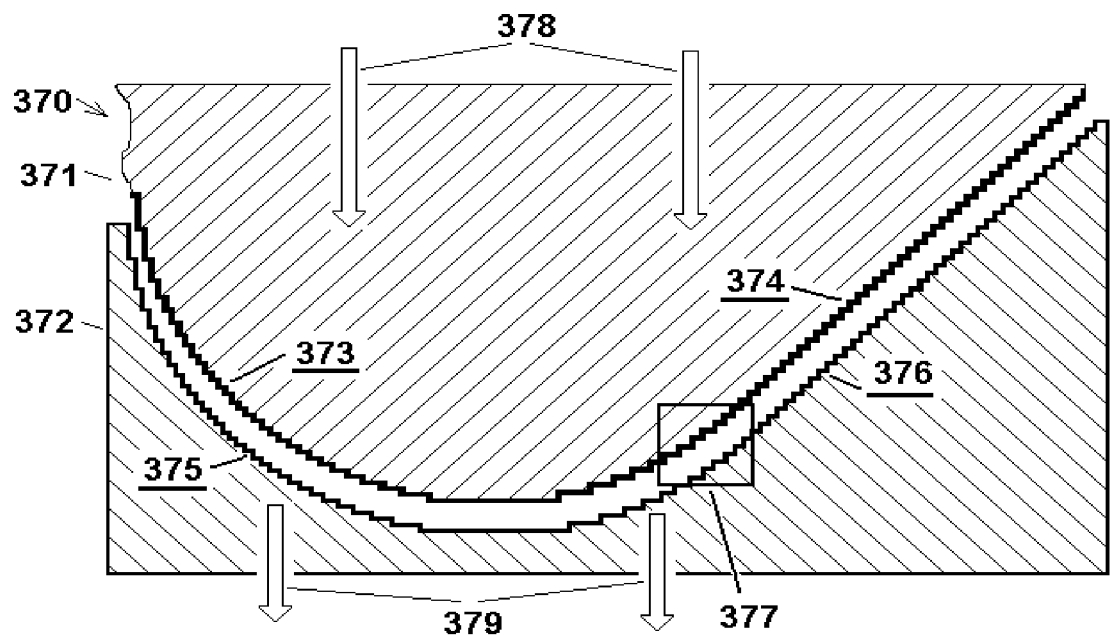

FIG. 15. is a cross section view of the male and female parts of FIG. 14 line and curve with Z stacking added.

Figure 16:
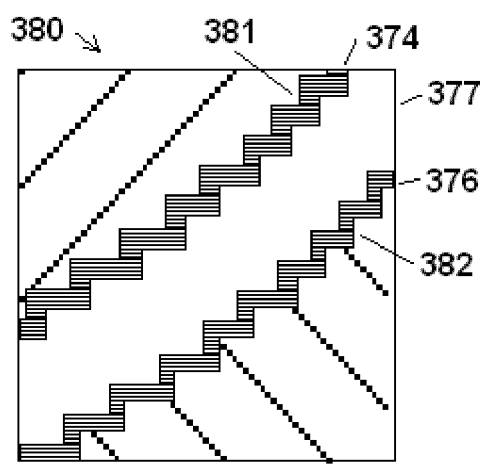

FIG. 16. is a magnified view of the portion of FIG. 15 shown in the rectangular box 377 showing magnified Z stacks.

Figure 17:
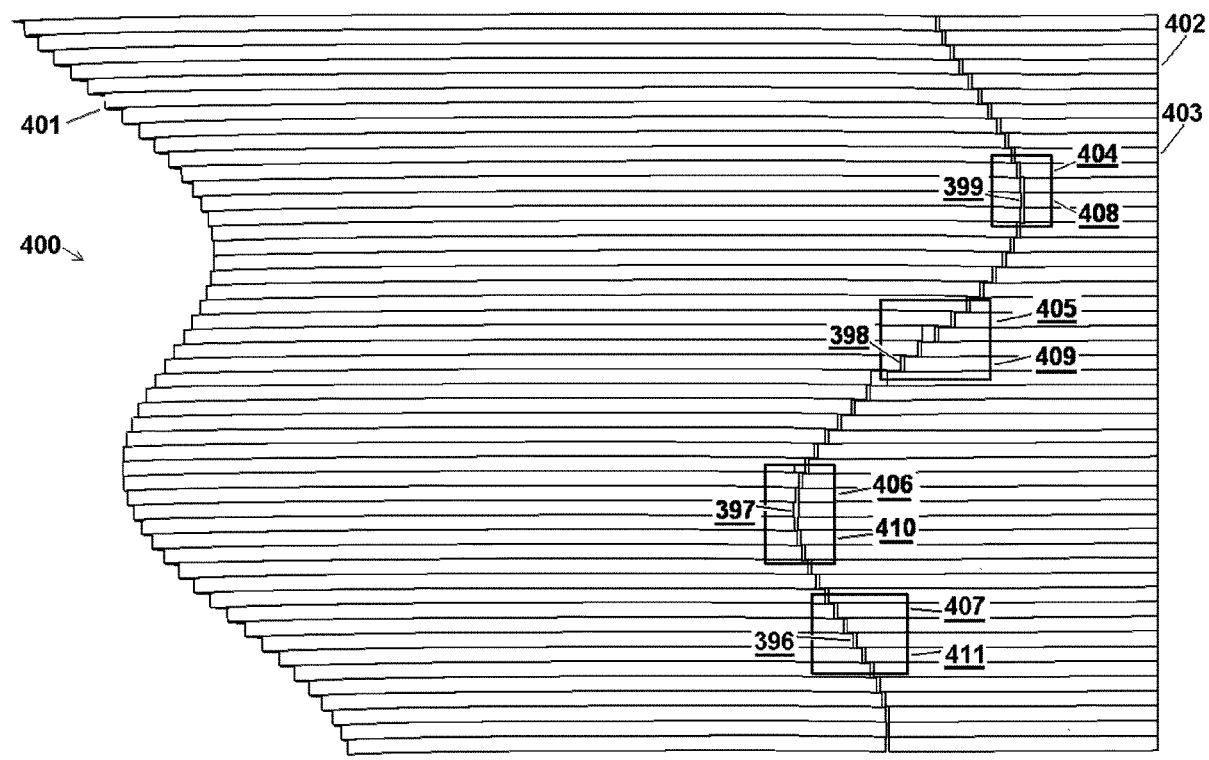

FIG. 17. is a cross section view of Z stacked male wave thread with mating female cross section.

Figure 18:
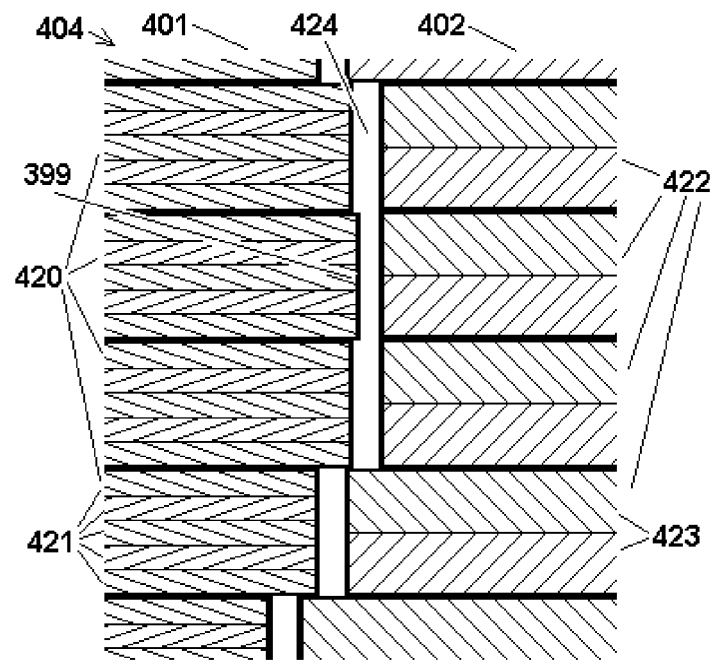

FIG. 18. is a magnified view of the portion of FIG. 17 shown in the rectangular box 404.

Figure 19:
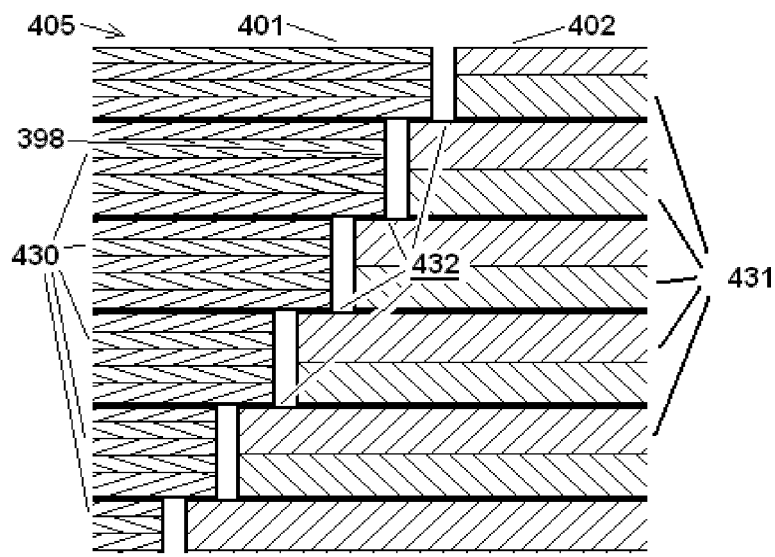

FIG. 19. is a magnified view of the portion of FIG. 17 shown in the rectangular box 405.

Figure 20:
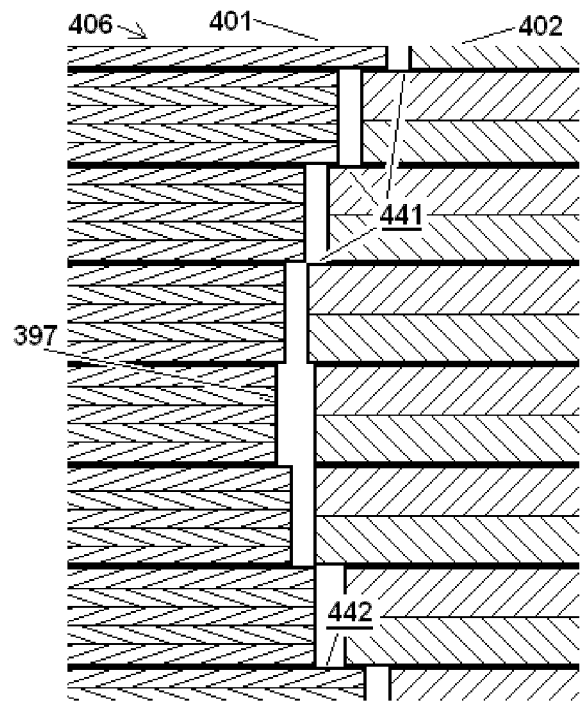

FIG. 20. is a magnified view of the portion of FIG. 17 shown in the rectangular box 406.

Figure 21:
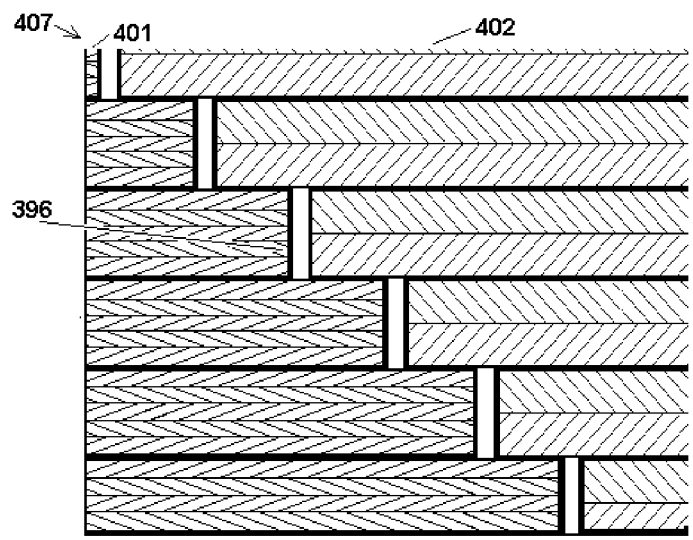

FIG. 21. is a magnified view of the portion of FIG. 17 shown in the rectangular box 407.

Figure 22:
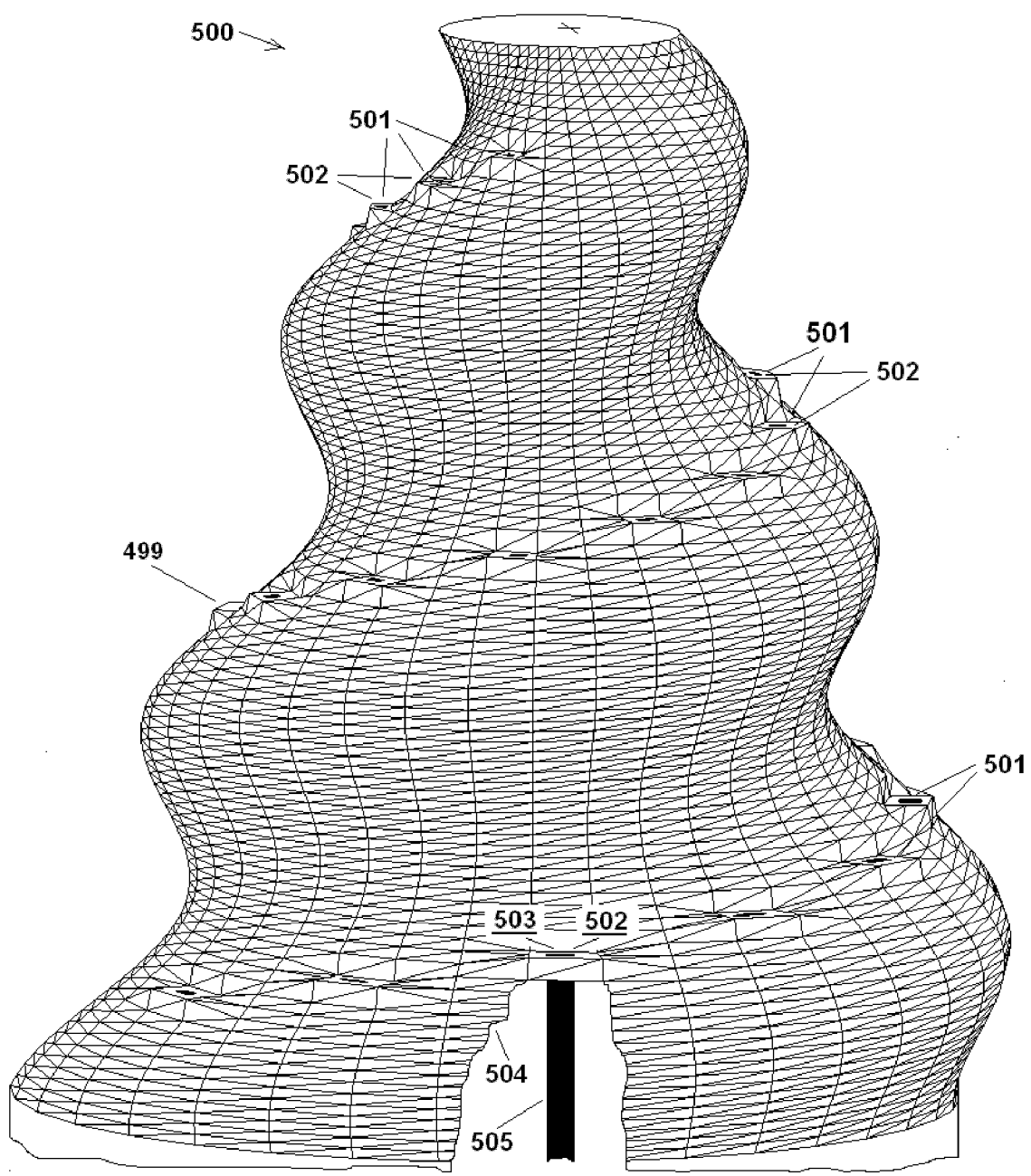

FIG. 22. is a side wireframe view of male wave thread component with channels that lead to Z seated positions.

Figure 23:
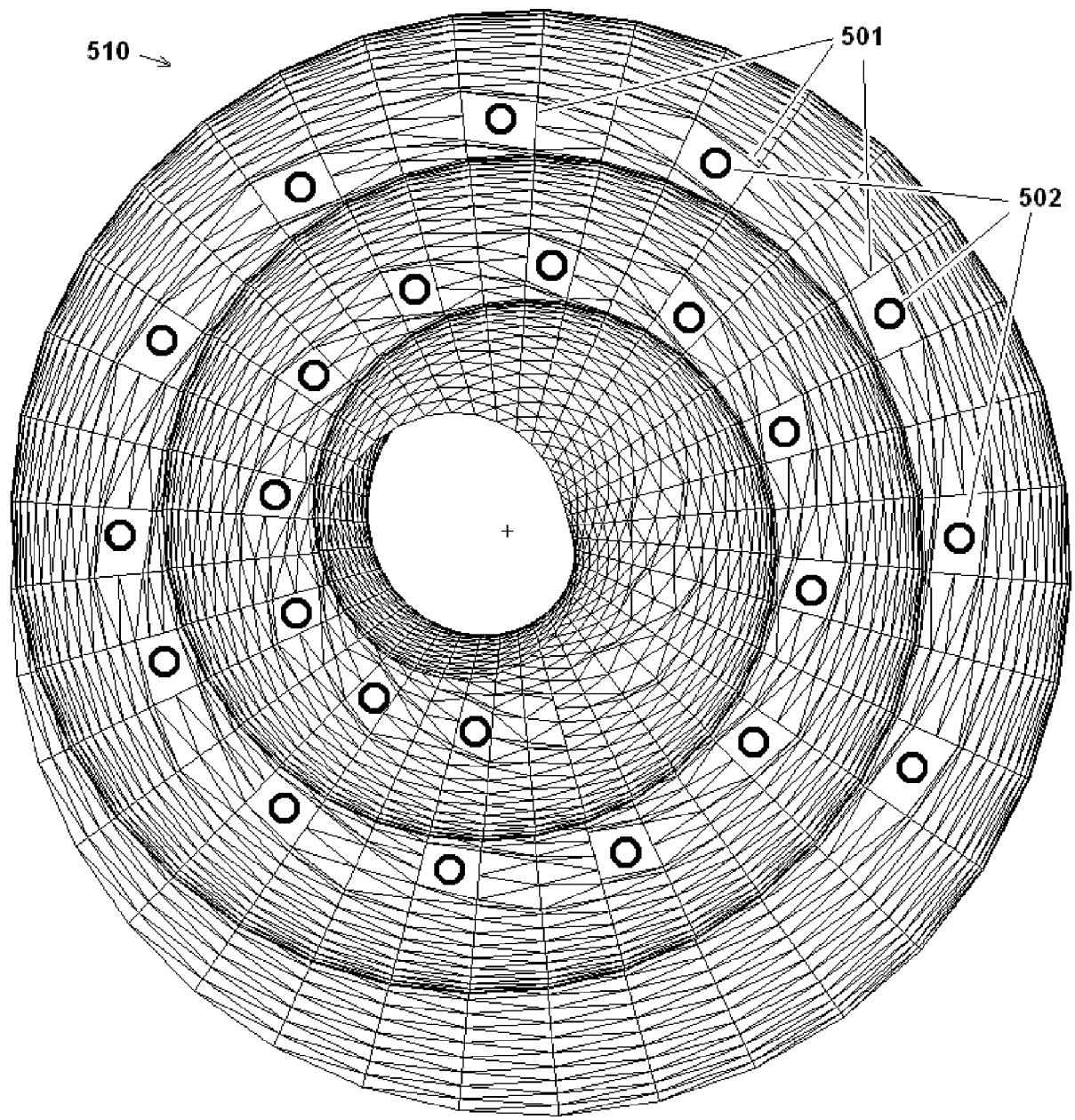
Figure 24:
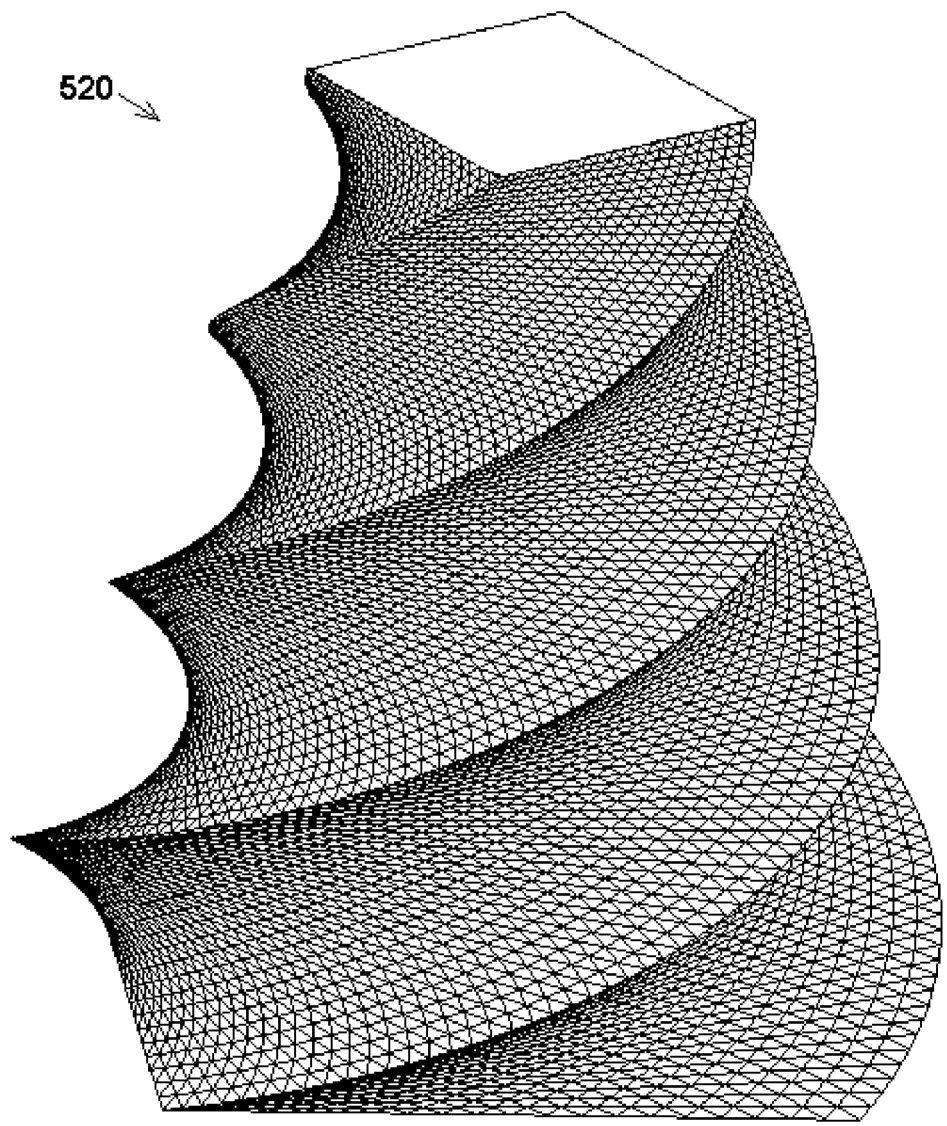

FIG. 23. is a top view of the male wave thread component of FIG. 22 highlighting Z seated positions FIG. 24. is a side wireframe view of a prior art male concentric thread component.

DETAILED DESCRIPTION OF THE DRAWINGS

The 3D Z layer engineered Z seat, Z ridge, Z rib, Z tooth, Z snap lock, Z stack and Z channel are collectively referred to herein as Z layer structures. The subset of Z seat, Z ridge and Z rib are collectively referred to as Z layer sealing structures.

Z Layer Sealing Structures

As described in detail below, Z layer sealing structures are micro in that their size relative to the thickness of their Z layers and the number of Z layers they use. They augment an existing drawing converted into the geometry of 3D printer layers and create the structures in these layers. Z seats are precision mating between the male and female parts. There can be multiple numbers of seats creating bands of seals. Z ridges can take many forms and typically are on one of the male threaded connector or the female part, but can be on both. Z Ribs are vertical ridges enhancing lateral Z ridges.

Z Ridges

The Z ridges overcome the irregularity of the 3D fabrication to form a seal against the mating part. The irregularity includes varied spacing between the parts, changing surface angles due to fabrication interpretation and tooling. While there can be a receiving cavity for these Z ridges, that is not as practical. These Z ridges are best deployed against a finished surface. Z ridges against other 3D printed parts requires compensating for irregularities on both parts where Z seating may be more practical.

Z ridges are extensions of one or more Z layers. If the Z resolution is 0.001", extensions of Z ridges could be under 0.010", small enough to deform under the desired pressure of engagement. The variables include materials and fabrication processes. Metal sintering or melting by laser has layers in micro meters while Free Form Fabrication (FFF) can lay down a filament of plastic in layers 0.005". The thickness or number of layers these extensions have are relative to what can be achieved within these variables.

Designing a Z ridge application is matching the vertical and lateral components of the engagement process with the surface interaction. These Z ridges push into the surface vertically while digging into the surface laterally. Minimizing their size minimizes this deformation. On a circular curve, the surface closer to beginning 0-degree top will have a lot of digging while the surfaces closer to the ending 90-degree bottom will approach no digging. This digging deforms or rip materials in a way that enhances the sealing aspects across a specific Z layer by being a plug against an irregular surface. Excessive digging will inhibit contact with other areas of the mating surfaces.

Figure 1:
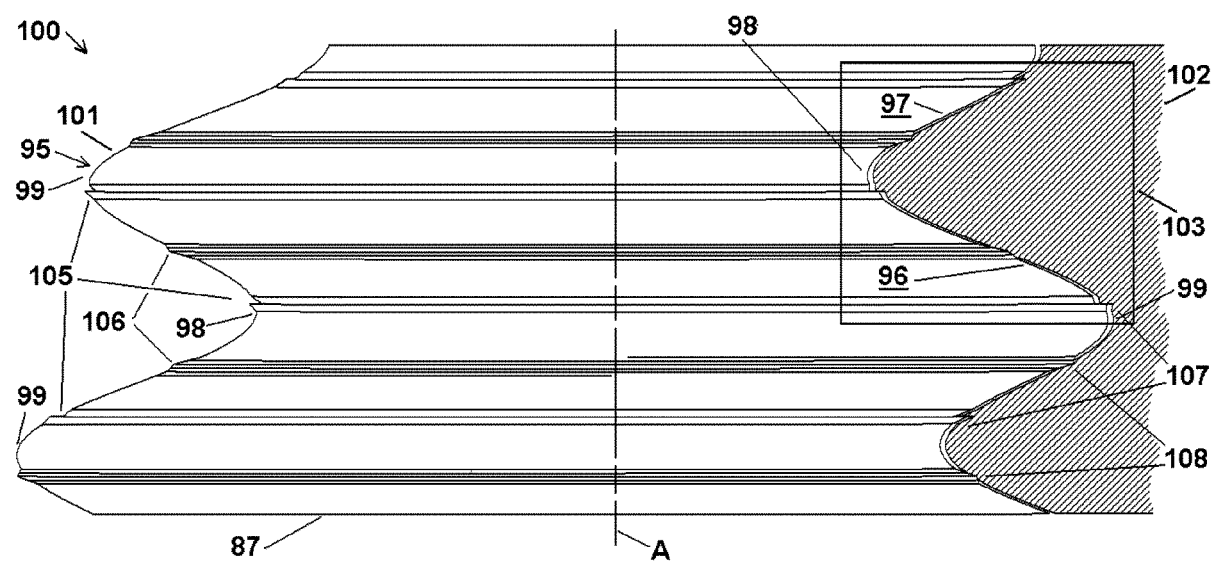

The first example of a Z engineered threaded connector system 100 is shown in FIG. 1, which demonstrates male/female Z seating 105, 107 and Z ridges 106, 108. The Z engineered threaded connector 101 includes a body 87 having a Z axis A and an outer surface 95 along which is disposed a thread defined by at least one crest 99, at least one root 98, and at least one flank 96, 97 between the crest 99 and root 98. FIG. 1 is front view of a male wave threaded connector 101 mated with a female cross section 102 to show the surface relationships. The Z seat 105 a substantially planar seating surface extending from the outer surface 95 perpendicular to the central axis A to form a substantially flat ring around the threaded connector 101 designed to engage with the Z seat of a mating thread. The Z ridges 106, 108 are protrusions extending perpendicular from the Z axis A that engage the mating side. The box 103 is for an exploded view.

Figure 2:
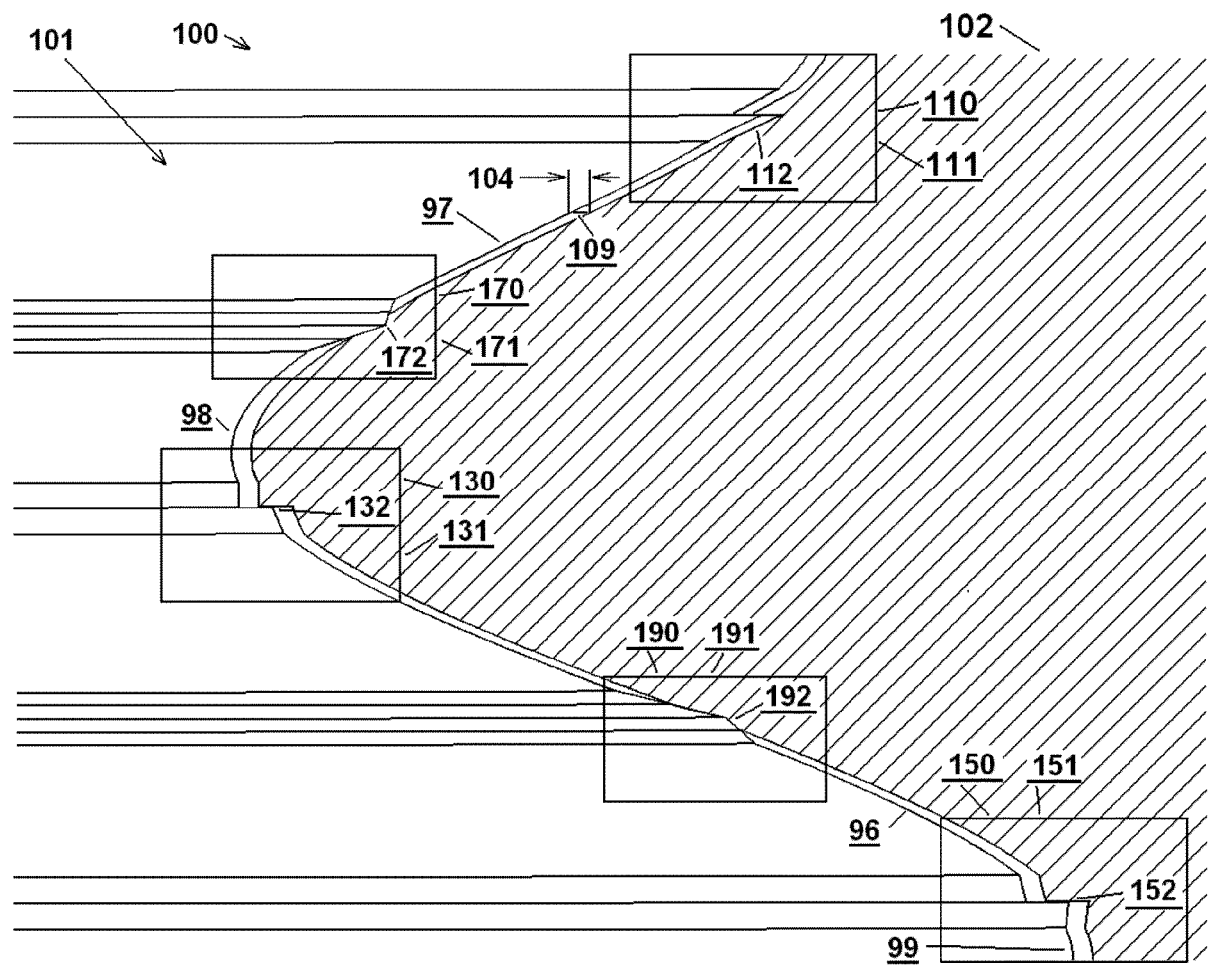

FIG. 2 is the exploded view in the area identified by the box 103 from FIG. 1. In this embodiment, the lateral spacing 109, which is the distance 104 between the male threaded connector 101 and the female part 102, is the tolerance of the 3D printing machine manufacturing the part. The distance 104 is lateral, meaning the Z layer values remain the same but all the female XY boundaries are larger than the male. This threaded connector system 100 was made to have the male threaded connector 101 and female part 103 terminate with an aligned flat top not shown. The Z seats 105 and Z ridges 106 are larger than distance 104 to exceed this tolerance. FIG. 2 has two Z ridges 172, 192 and three Z seats 112, 132, 152. The Z ridge 172 in box 170 is under the flank 97 at position 171. The ridge box 190 is over the male 101 flank 96 at position 191. The Z seat example box 110 at position 111 is on the underside of the male thread 101 flank 97. Z seat box 130 at position 131 is near the thread root 98. Z Seat box 150 at position 151 is closer to the thread crest 99.

Figure 3:
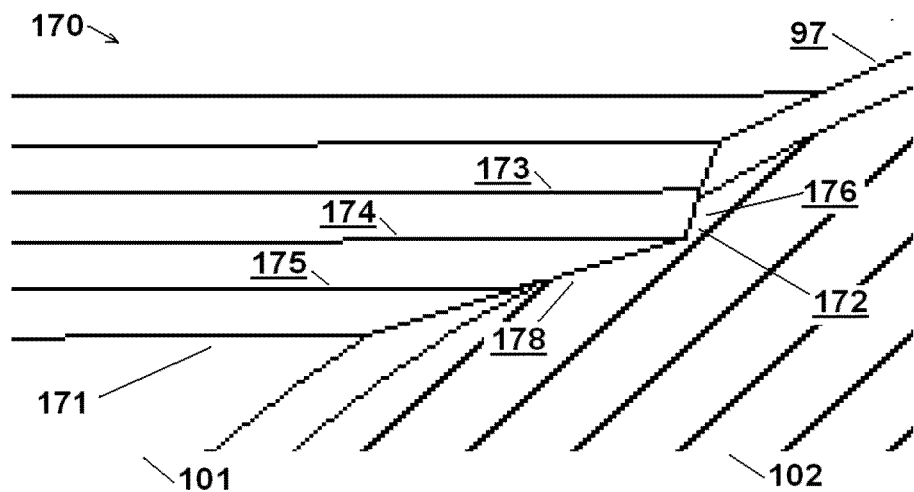
Figure 4:
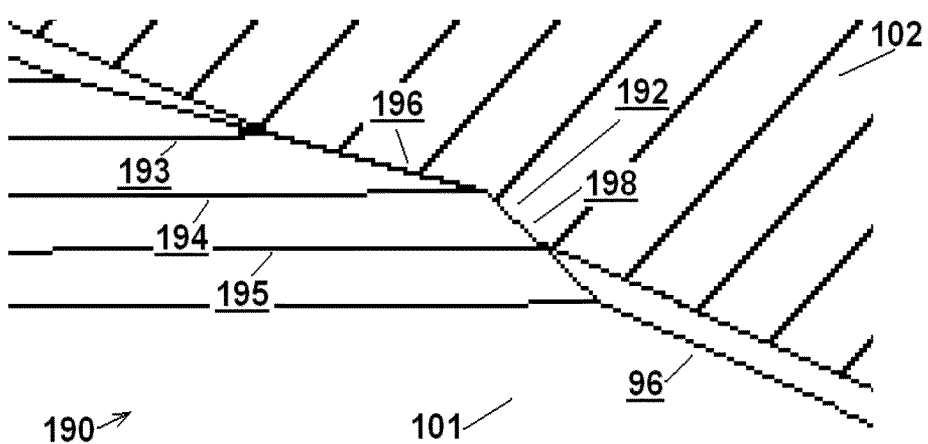

FIGS. 3 and 4 are Z ridge examples in FIG. 2 box 170, 190. They demonstrate Z ridges at different positions. FIG. 3 is box 170 from FIG. 2 with ridge 172 under the flank 97 of the male thread 101. This Z ridge 172 is shown as an extension of Z lines 173, 174, 175 that forms a protrusion 176 that is shaped and dimensioned to deform, either by indenting or cutting into the female surface 102 at position 178. FIG. 4 is box 190 from FIG. 2 with Z ridge 192 extending from the top flank 96 on the surface of the male thread 101. This Z ridge 192 is formed from a series of planar layers 193, 194, 195 disposed perpendicular to the Z axis that make a protrusion 196 that deforms the female surface 102 at position 198. This Z ridge 192 extending into the irregular surface will add order to the connection.

The FIGS. 2 and 3 are drawings with straight lines. Actual parts will be rough and irregular in the scale of thousandths of an inch. Making the Z ridges 172, 192 requires adding enough definition to an extending protrusion to pierce the tolerance irregularities and deform and engage with another surface. Although the Z ridges 172, 192 were shown as extensions of the male surface, it is noted that Z ridges may be disposed on the female surface or on both the male and female surfaces at different locations along the flank. Further, it is noted that FIGS. 2 and 3 are cross sectional views and it is understood that each Z ridge will be a continuous ridge that protrudes outward perpendicular to the Z axis A across the entire outer surface.

Z Seats

The Z seat structure is made by extending and contracting the axial radius values of multiple Z layers that result in flat areas. The precision of the Z layers means these layers are being altered from the normal part geometry to create extensions beyond the part and cavities into the part. There are effectively steps with a minimum of two layers altered to form an inner and outer boundary. Engagement requires room for the extensions of one part to move into opposing cavities of the other part during the closure process.

Z seats are designed on specific Z layers that can be partial or ringed around the circumference of the part. Z seats can have cavities into the surface and extensions out of the surface. Their primary limitation is to be small enough to not interfere with closure. The smaller male crest has to pass through the larger female root while approaching the termination point. The cavities allow clearance of the corresponding seating surface to engage at the termination point. Termination has some compression of the seated surfaces.

Figure 5:
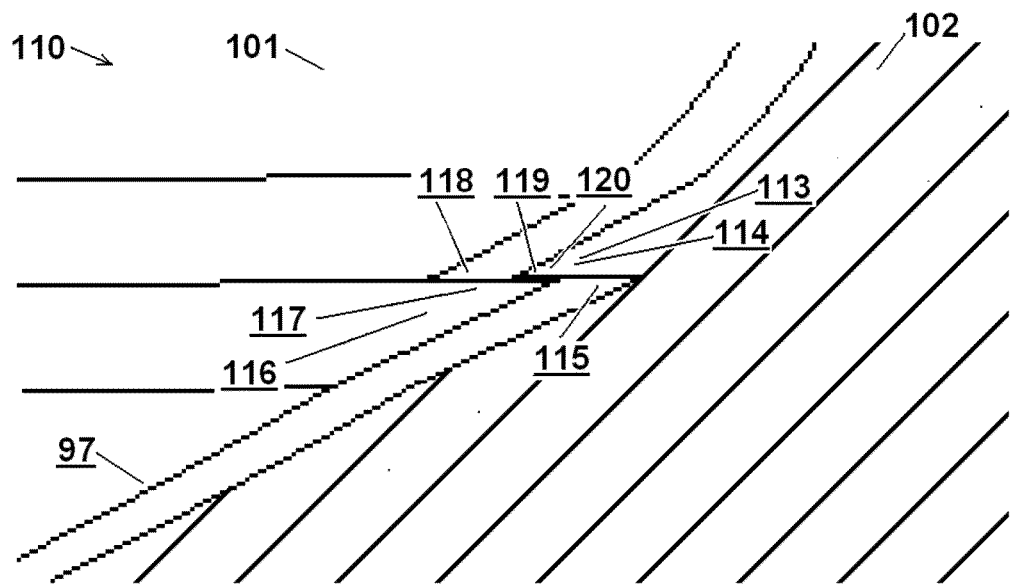
Figure 6:
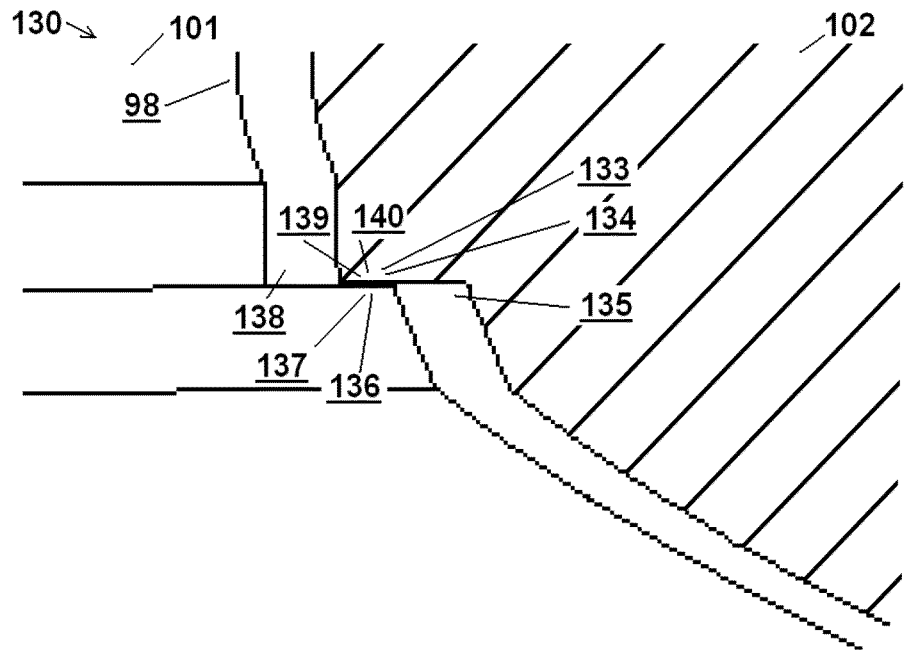
Figure 7:
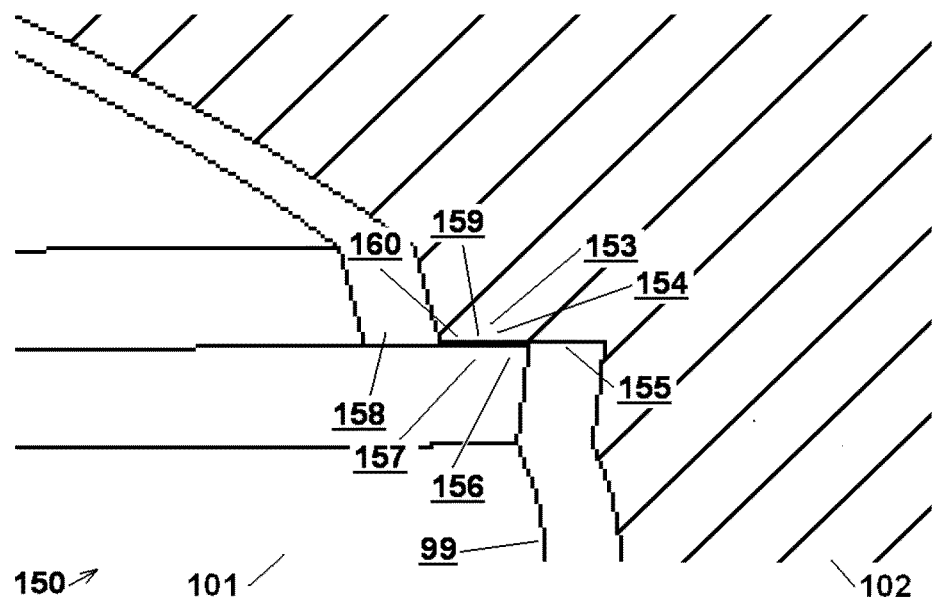

FIGS. 5-7 are the Z seat examples in box 110, 130, 150. Z seats changes remarkably from under flank 96 in FIGS. 2 and 5 to over under flank 97 in FIGS. 2 and 7. In FIG. 1 thread 101 has the Z seat 107 circling part 100. The FIGS. 5-7 are samples of that circumference to show its extremes.

FIG. 5 is box 110 from FIG. 2 that shows the seating example. The female Z seating surface 113 at position 114 also has a cavity 115 into the female thread 102. The male Z seating surface 116 at position 117 has a cavity 118. The shared Z seating 120 occurs where the male seating surface 116 engages the female seating surface 113 at position 119. This is an under flank 97 position of both the male and female parts. Note that the total shared Z seated area 120 in the under flank 97 can be as small as 20% the size of the over flank shared seating not shown. It is smaller then the crest 89 shared seating 159 in FIG. 7 because it is a reach.

FIG. 6 is box 130 from FIG. 2 that is Z seating example near the thread root 98. The female Z seating surface 133 at position 134 has a cavity 135. The male Z seating surface 136 at position 137 also has a cavity 138. At position 139 the male seating surface 136 engages the female seating surface 133 forming a shared Z seat 140. This is the easier Z seating because it is above the flank.

FIG. 7 is box 150 from FIG. 2 with Z seating near the thread crest 99. The female seating surface 153 at position 154 has a cavity 155. The male seating surface 156 at position 157 has a cavity 158. The engagement 160 occurs at position 159 where the male 156 overlaps the female 153. It should be noted that the Z seating 160 is the wider than 140 in FIG. 6 or 120 in FIG. 5. That is because the top flank position 159 on wave thread 101 has a wider Z seat while the bottom flank at position 119 in FIG. 5 is a narrower seat 120.

The Z seating in FIGS. 5-7 are examples of the continuous surface in FIG. 1. The FIG. 1 Z seats 105 and ridges 106 went around the male part 101. The female cross section 102 represents a continuous internal surface with matching Z seats at 107 and the male ridges deform the female surface 108.

Male and female parts designed specifically for 3D printing are preferred to have combinations of seating surfaces and cavities. Their applications can be mixed.

Figure 8A:
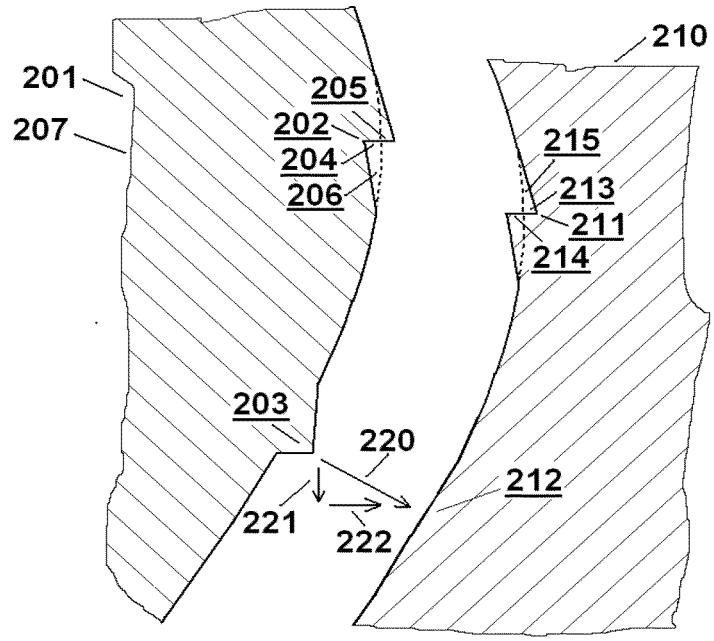
FIG. 8A is a cross section view of male and female parts with Z seats and ridges at a point prior to engagement.
Figure 8B:
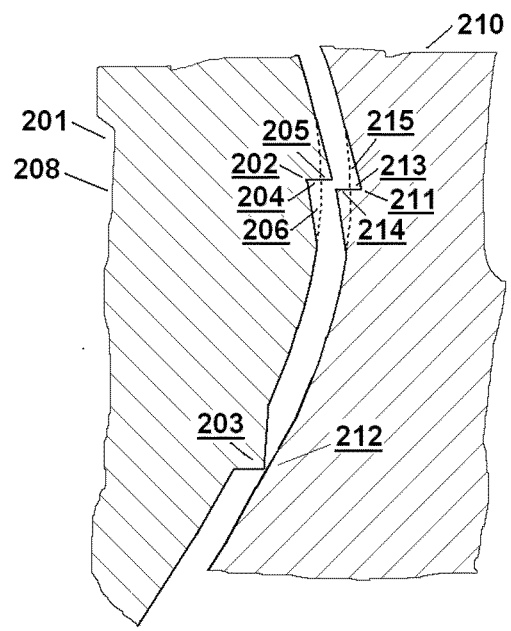
FIG. 8B is a cross section view of the male and female parts of FIG. 8A with Z seats and ridges at a starting point for engagement with Z ridge contacting the surface of female part.
Figure 8C:
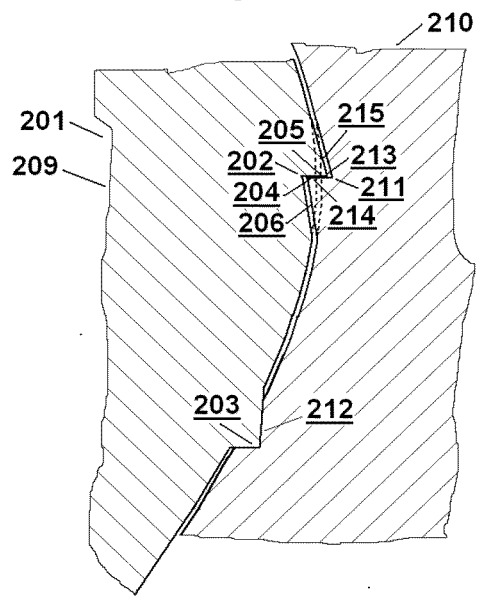
FIG. 8C is a cross section view of the male and female parts of FIG. 8A with Z seats and ridges fully engaged.

FIGS. 8A-C are another example showing of the engagement of cross sections of a male 201 and female 210 parts with Z seats 202 211 and ridges 203, 212. The male 201 and female 210 have a cavity 204, 213 and a seating surface 205, 214 that forms the seat 202, 211 out of the original design surface 206, 215. The male part 201 in FIG. 8A is at starting position 207. In the subsequent FIGS. 8B and 8C it will move the male part 201 in the direction of 220, with a downward component 221 and a sideways component 222.

In FIG. 8B, the male thread has moved to position 208. That puts the male seating surface 205 close to the female seating surface 214. In reality they would be within the fabrication tolerance and the need for the cavity would be more apparent. In FIG. 8C with the male thread 201 positioned at 209, the seating surfaces 205 214 have seated. The seating surface 205 214 are also inside the cavities 204, 213. The drawings do not represent the irregular surfaces. The ridge 203 looks like an angular seating surface, but it can be pointed or any shape. In FIG. 8C the ridge 203 is pressed into the female part 210 at position 212. This can cut or deform depending on the material, its elasticity and the shape of the ridge.

3D printed seating will work with all threads that increase their diameter. That includes all the Van Cor Threads such as the one in FIG. 1 that is a wave thread. The Van Cor Threads are the conic thread, wave thread, concentric thread, and key thread. It also includes any tapered threads such as the API and NPT pipe thread which has a taper angle. The NPT and other tapered threads have a design range that applied to variations in machining.

Like the Van Cor Threads, these machined or molded NPT threaded parts can be used with 3D printed parts that have ridges pressed against the sides of the finished parts. These ridges are small relative to the threads and can be plentiful. Each one is a small seating surface of a changing thread radius. Normally NPT and other threads require a gasket or sealant material because all the surfaces do not touch.

The ridges applied to a portion of a male ½" NPT thread 250 is shown in FIG. 9. The ridges 251, 253 at respective positions 252, 254 are examples. This 3D printed model would be used inside a mating female NPT with a high resolution finish. This would allow the 3D male to form a seal against the female by piercing its XY irregularities of its tolerance. The ridge would deform or be deformed against the smoother, higher resolution manufactured surface.

Z seating was not in the FIG. 9 example because the most likely scenario is a 3D printed male part against a finished female surface. Z seating is difficult to mold or machine, and even harder for an internal female thread. This type of 3D Z seating will work with any thread that has a changing diameter. That means the male and female roots and crests are moving into each other to a specific termination point of engagement. A constant diameter thread like a UNC bolt thread will not work because they need a clearance space for the male threads to move through the females threads at a constant rate. Anything filling that clearance space would be subject to wear by the process of engaging. There is no unique termination point to establish a seal.

Material strength and elasticity effect the deformation of 3D printed parts. That is relevant in selecting the number of layers and size of the sealing areas.

Z Ribs

For pressure applications using quarter turn connectors, or other short travel connectors, vertical or angular "ribs" can be added to the Z ridge system. These will create cells that isolate leaks instead of exposing the entire Z layer. Z ribs add a hatch work of with vertical components to the horizontal component of Z layer ridges. The preferred Z ribs will follow the same thread position. Where on the thread will effect its design. If a Z rib is on the thread crest, it may dig into the surface too much; if it is in the root, it may not be enough. While Z ridges and Z ribs will compensate for 3d printing irregularities, Z seating is the desired structural solution.

In FIG. 10 the wave thread 270 has a Z ridge 271 at position 272 and another Z ridge 273 positioned at 274. From top to bottom there are Z ribs 276 and 278 that cross through the Z ridges 271 273. They split the space between the Z ridges into chambers 275. When the male and female parts are engaged, these male Z ridges 271 273 are against the surfaces of the internal female thread, these Z ribs also are against the sides forming a second barrier. If a position of a Z ridge fails, the Z ribs contain that failure. FIG. 11 is the same wave thread and Z ridge as FIG. 10, but these Z ribs 280 281 282 283 follow the thread profile. That means 280 is on the crest from top to bottom and 282 is on the root from top to bottom forming chamber 285. When screwing these threads together, these Z ribs will engage at the same rate of change as the threads. This is the preferred method of using Z ribs. Compared to the more vertical change in FIG. 10, it is a smoother engagement.

Flat Z Layer Structures

The inclusion of flat Z layer structures applied to the entire surface provides advantages in non-fluid sealing applications. As described in detail below, Z layer stacking is a rendering process where multiple Z layers identified as a stack are assigned XY values of one layer. These stacks will take a curved or angular surface and gives it a step like appearance. Multiple stacking will follow the same surface shape. The purpose is for more reliable assembly with mating stacked parts. The XY rending of curved and angular surfaces will vary with machines while stacking maximizes the use of the more predictable Z value within a specific XY tolerance. Z teeth are for fastening against a smooth surface. Z snap locks can be multitudes of small mating fasteners. Z stacking is similar to wholesale Z seating over larger surfaces with specific increments.

Z Teeth

The extending and retracting Z layers boundaries have other components such as Z teeth 341 in FIG. 12. It is extended z layers like Z seating, but in the reverse direction. The geometry of these Z layers form a tooth 341 with ramp 351 and a sharp drop 352. In the material it is pressing against this tooth 351 deforms the surface 350 of the mating part. The shape 341 allows the teeth to be pushed over the surfaces but resist being pulled back. This is its sole purpose, resist being pulled against its direction of insertion.

Z Snap Lock

A Z snap lock has a structural resistance that is overcome followed by a release of that resistance into a holding geometry of a mating component. It is pressed and snaps into place. That holding geometry has to be overcome to unlock. FIG. 13 A-C is an example of the snap lock 640 concept. The Z layers of an existing connection are extended and retracted. The male 631 has Z layers extending out wards 641 in a curved shape. The female has Z layers extending outwards forming a bulge 642 shape that is the resistance the male 631 will encounter. Then the female Z layers recede at 643 forming a cavity that the male will fall into. That as the stress release mechanism.

Most of the examples shown have threads that change diameters and engage in an angular direction. The male component 631 inside the female component 630 is moving in an angular direction 632 to terminal engagement. FIG. 13 A identifies the male 631 at position 633 relative to the fixed female 630 position 639. FIG. 13 B is the collision of the male 631 Z extension 641 moving 634 against the females 630 hump 642 and meeting resistance 636. FIG. 13 C is the male 631 extension 641 positioned 635 in the female 630 cavity 643. FIG. 13 B is the hitting the resistance 636 and FIG. 13 C is the relief of that resistance into the cavity 643 where it is still under some compression 637.

There are other ways to create a resistance and a relief from it. The Z snap lock on a flat surface will have more of a hook shape. The purpose of the Z snap lock is to be a simple and easily populated connection structure that can be used for fastening.

Z Stacked Connections

Z stacking is any angle or curved surfaces that are is converted to steps. These are a conversion to a standard process of parts from different methods and resolutions into a shared net geometry for assembly. An FFF part may be in two 0.005" layers for a total of 0.010" net Z stack thickness. This will mate with SLA parts made with five 0.002" layers also totaling 0.010" net Z stack thickness. The Z stacks at the terminations of two mating surfaces though this does not necessarily seal.

Z stacking is a rendering process for the fabrication. It follows the contours of shapes by making bigger "layers" or stacks mostly in multiples of the printing tolerance. It is total or partial to create a common fit of assembled components.

Z seating is designed for one direction of assembly. That means cavities and extension create the Z seats facing the same direction for angled and curved surfaces. Z stacking is changing the resolution, reducing the amount of variations in a geometry to fit a fabrication process. It is more about the geometry then the direction. Z stacking has a net thickness for a common fit. Different printing will use different stacking ratios of number of Z layers to meet the net thickness.

Angled and curved geometries on a part will vector mechanical stress perpendicular to the surface. Z stacking will align mechanical stress with the axis of the part.

The concept of Z stacking in FIG. 14 360 has a cross section of two mating parts 361 362 with curves 363 365 and angle sides 364 366. The applied mechanical stresses 367 is vectored 369 perpendicular to the angled side 364 366. The stress 367 will be vectored 368 perpendicular at all points through on the curve 363 365.

FIG. 15 370 is the same parts with stacking applied. The mating parts 371 372 have mating curves 373 375 that have discernible steps. The mating angled sides 374 376 are more pronounced steps. These steps are multiple Z layers to be 3D printed. When fully engaged, the mechanical loads 378 are transmitted through the z layers in the same aligned direction 379. The framed area 377 is expanded in FIG. 16 380 for more clarity. The stacked cross section 377 shows the multitude of identical layers 381 382. The parts 371 372 are shown as not connected.

A more complex example 400 in FIG. 17 has a side view of a Z stacked male wave thread 401 engaged with the cross section of a female wave thread 402 at position 403. The stacking is viewed with expanded closeups. The closeup box 404 positioned 408 at the crest 399 of the male thread 401 will be expanded in FIG. 18. The box 405 positioned 409 under the flank 398 will be in FIG. 19. The box 406 positioned 410 at the root 397 is in FIG. 20 and the box 407 positioned 411 over the flank 397 in FIG. 21. The over 396 and under 398 flanks are in opposite directions compared with Z seating that would have an under flank in the same direction as the over flank as shown in FIG. 5. That change in Z stack direction makes it hard to seal.

FIG. 18 is an expansion of the box 404 on the crest 399 of the male wave thread 401. It is shown with male 401 stacks 420 each with 5 layers 421. The female cross section 402 has stacks 422 with two layers 423 equal in height to the male stack 420. The spacing 424 between the stacks 420 422 is the combined tolerance between the male 401 and female 402 processes. In actuality they are irregular. It is best to have the smallest tolerance possible so where they touch there is some compression.

FIG. 19 is box 405 under the flank 398 of the male thread 401. Its stacks 430 431 are all engaged 432 on the consistent Z layers. FIG. 20 is the box 406 on the root 397 of the male thread 401. These Z layer assemblies 440 transition from under 441 to over 442. FIG. 21 is box 407 on the over flank 396 of the male thread 401.

Z Channels

Z layer engineering modification of Z layers can be internal and Z channels can be included in any of the connectors described herein. While these are made as channels, they can be filled with different materials from other source devices. An unspooling device can apply a wire, tube or fiber in the Z channel. An additional print device could print electrically conductive, optically transparent, or cement into that channel space.

FIG. 22 is male wave thread 500. It has been Z layer engineered with Z seats 501 added in a spiral pattern 499. Channels 502 begin on the Z seats 501 in position 502 and extend through the part. At position 503 is a cut away 504 showing channel 505. The top view 510 in FIG. 23 shows the pattern of the Z seated 501 areas and the channels 502 through them.

There are other Van Cor Threads that may be a better choice. FIG. 24 is a square shaped Concentric thread 520. An eight line group may do better with a concentric thread with an eight sided shape not shown. What matters is a thread that can align and compress the Z seating and have enough surface contact to resist a continuous leak path aka make a seal. Even a passive (low pressure) seal would serve many of applications.

One of the hard products to 3D print are valves. The Van Cor Threads have a valve design with the male thread being the control thread and valve plunger and the female the valve seat. The 3D printing aspect of Z stacking is across the layers of the valve seat and plunger. Most valves can be 3D printed with Z stacking. The parts are made with their Z layer plunger matching the valve seating.

Z layer engineering starts with a proven base model developed for a specific fabrication process, specific material, which screws together, locking and sealing. Then Z layer engineering structures are added and the finished model printed on a submarine, in the middle of the Congo or on the space station.

Although the present invention has been described in considerable detail with reference to certain preferred versions thereof, other versions would be readily apparent to those of ordinary skill in the art. Therefore, the spirit and scope of the invention should not be limited to the description of the preferred versions contained herein.

What is claimed is:

1. A threaded connector system comprising:
    a male threaded connector comprising:
        a body comprising a central axis and an outer surface;
        wherein said outer surface of said body comprises at least one thread comprising at least one crest, at least one root and at least one flank between said crest and said root; and
    a female part comprising a part body through which is disposed an opening having an inner surface;
        wherein said inner surface of said female part is shaped and dimensioned to mate with said outer surface of said male threaded connector and comprises at least one thread comprising at least one crest, at least one root and at least one flank between said crest and said root; and
    wherein at least one of said outer surface of said male threaded connector and said inner surface of said female part further comprises at least one Z layer sealing structure selected from a group consisting of:
        a Z ridge comprising a protrusion extending from said thread of said outer surface of said male threaded connector perpendicular to said Z axis and shaped and dimensioned to deform said inner surface of said female part; and
        a Z ridge comprising a protrusion extending from said thread of said inner surface of said female part perpendicular to said Z axis and shaped and dimensioned to deform said thread of said outer surface of said male threaded connector.

2. The threaded connector system as claimed in claim 1 wherein said at least one Z layer structure is a Z ridge comprising a protrusion extending from said thread of said outer surface of said male threaded connector perpendicular to said Z axis and shaped and dimensioned to deform said inner surface of said female part.

3. The threaded connector system as claimed in claim 1 wherein said at least one Z layer structure is a Z ridge comprising a protrusion extending from said thread of said inner surface of said female part perpendicular to said Z axis and shaped and dimensioned to deform said outer surface of said male threaded connector.

4. The threaded connector system as claimed in claim 2 wherein said at least one Z layer structure further comprises a Z rib comprising a protrusion extending from at least one of said crest, said root and said flank of said thread of said male threaded connector and shaped and dimensioned to deform said inner surface of said mating female part.

5. The threaded connector system as claimed in claim 3 wherein said at least one Z layer structure further comprises a Z rib comprising a protrusion extending from at least one of said crest, said root and said flank of said thread of said female part and shaped and dimensioned to deform said outer surface of said mating male threaded connector.

6. A threaded connector system comprising:
    a male threaded connector comprising:
        a body comprising a central axis and an outer surface;
        wherein said outer surface of said body comprises at least one thread comprising at least one crest, at least one root and at least one flank between said crest and said root; and
    a female part comprising a part body through which is disposed an opening having an inner surface;
        wherein said inner surface of said female part is shaped and dimensioned to mate with said outer surface of said male threaded connector and comprises at least one thread comprising at least one crest, at least one root and at least one flank between said crest and said root; and
    wherein said thread of said outer surface of said male threaded connector and said thread of said inner surface of said female part each further comprises at least one Z layer sealing structure comprising;
        a first Z seat comprising a substantially planar first seating surface extending from said thread of said outer surface of said male threaded connector perpendicular to said Z axis and a first cavity disposed proximate to said first seating surface; and
        a second Z seat comprising a substantially planar second seating surface extending from said thread of said inner surface of said female part perpendicular to said Z axis and a second cavity disposed proximate to said second seating surface; and
        wherein said first Z seat and said second Z seat are positioned and dimensioned to mate together to form a fluid tight seal.

7. A threaded connector system comprising:
    a male threaded connector comprising:
        a body comprising a central axis and an outer surface;

wherein said outer surface of said body comprises at least one thread comprising at least one crest, at least one root and at least one flank between said crest and said root; and a female part comprising a part body through which is disposed an opening having an inner surface;
- wherein said inner surface of said female part is shaped and dimensioned to mate with said outer surface of said male threaded connector and comprises at least one thread comprising at least one crest, at least one root and at least one flank between said crest and said root; and wherein at least one of said thread of said outer surface of said male threaded connector and said thread of said inner surface of said female part further comprises at least one flat Z layer structure; and wherein said at least one flat Z layer structure is at least one Z snap lock extending from each of said thread of said outer surface of said male threaded connector and said thread of said inner surface of said female part, wherein said at least one Z snap lock extending from said thread of said outer surface of said male threaded connector is shaped and dimensioned to mate with a corresponding Z snap lock extending from said thread of said inner surface of said female part.

* * * * *